Oct. 24, 1950     S. RUBEN     2,526,692
PRIMARY CELL AND BATTERY
Filed Feb. 16, 1944
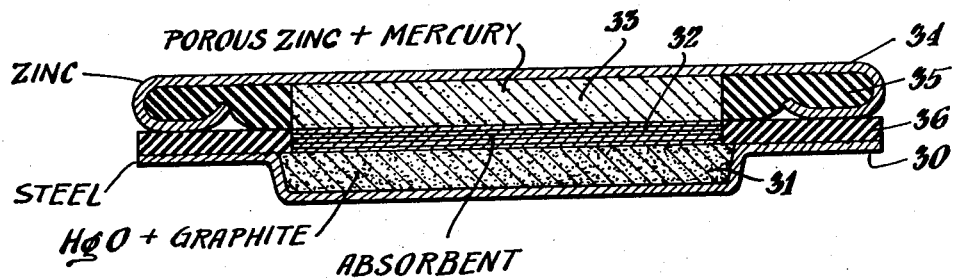
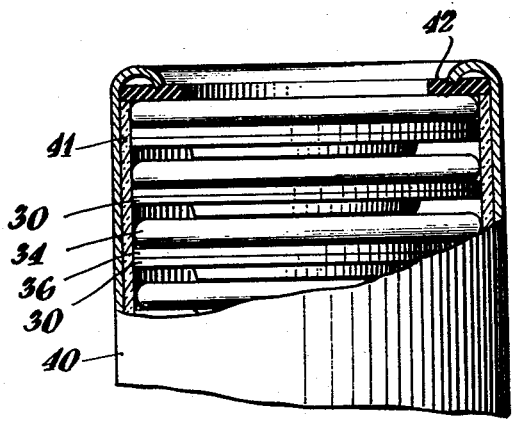
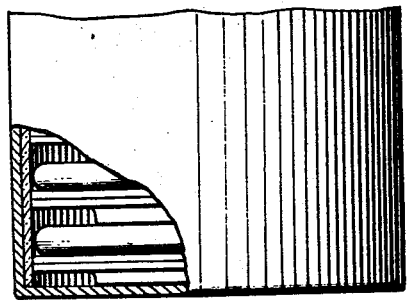
INVENTOR.
Samuel Ruben
BY Chester F. Carlson
ATTORNEY Patented Oct. 24, 1950

2,526,692

UNITED STATES PATENT OFFICE 2,526,692

PRIMARY CELL AND BATTERY

Samuel Ruben, New Rochelle, N. Y.

Application February 16, 1944, Serial No. 522,587

6 Claims. (Cl. 136—111)

This invention relates to primary cells and batteries.

An object of the invention is to improve primary cell assemblies and batteries.

Other objects of the invention will be apparent from the description and claims.

Figure 1 is a section of a flat type primary cell; and

Figure 2 illustrates a battery formed of a series of cells of the type shown in Figure 1.

The invention finds its preferred embodiment in primary cells of the type using a zinc anode, an alkaline electrolyte and an oxide depolarizer such as mercuric oxide or copper oxide. The invention contemplates a primary cell of improved construction and a battery construction involving an assembly of one or more primary cells in a suitable housing. According to one aspect of the invention a primary cell is contemplated which is held sealed by compression of the housing, and a battery is contemplated involving a stack or series of such cells all of which are held sealed by compression of the housing.

The present invention also makes possible a more economical cell construction and simplifies manufacture and assembly of the cells.

A difficult problem in the construction of primary cells using alkaline electrolytes is the tendency of the electrolyte to leak or creep. Where the container or the top is formed of zinc in the zinc alkali type cells, the greatest problem occurs at the external zinc surface due to reaction of the zinc with the creepage electrolyte in the presence of air. Alkaline electrolytes tend to creep along the zinc apparently due to a superficial oxide layer inherent to zinc. Coatings applied to the zinc such as pitch, waxes, synthetic resins and the like are ineffective to stop this creepage and are all lifted off the zinc surface after a time by the creeping electrolyte. I have found that cells of this type may be satisfactorily hermetically sealed in a manner to prevent electrolyte creepage by use of an elastic or plastic sealing member clamped under high pressure against the zinc surface.

Referring to the drawings, Figure 1 is a section through a flat primary cell adapted for assembly in a stack arrangement to produce a battery as shown in Figure 2. Each individual cell comprises a circular steel plate or dish 30 having a central recess therein in which is pressed a layer of depolarizing oxide composition 31, a paper spacer 32 impregnated with electrolyte, a porous anode layer 33 comprising a pressed zinc amalgam powder pellet, and a zinc disc 34 in contact with the anode layer.

The zinc amalgam powder and the anode are best made by adding 10 grams of mercuric oxide to a solution of 35% potassium hydroxide. 90 grams of pure zinc powder of 200 mesh size is added, the mixture being continuously stirred. The zinc rapidly reacts with the oxide to form the amalgam. Stirring is continued until the solution is clear and free of any signs of suspended material. The quantity of hydroxide is not critical but should be in excess of an amount necessary to completely cover the metal. The amalgam is then placed in an oven for approximately 4 hours at 60° C. after which the potassium hydroxide is drained off and the amalgam powder completely water washed free of any alkali. It is then drained and dried at approximately 80° C. The amalgam forms a free-flowing powder which may be readily pressed into discs, pellets or other forms. The powder is then pressed into a disc in a pelleting machine under pressure sufficient to obtain a density of about 80% of that of the solid amalgam. A pressure of about 10,000 pounds per square inch is generally suitable.

The depolarizer composition preferably may consist of mercuric oxide containing about 10% of micronized graphite. This is pressed into the depression of reduced diameter in the center of steel plate 30. Mercuric oxide has a long shelf life at high temperatures such as 140° F. and when mixed with micro graphite it maintains the cell voltage without excessive drop under various loads encountered, or in other words produces a cell of good regulation. For some services cupric oxide may be substituted in which case about the same ampere hour capacity is obtained from the same volume of depolarizer. This weighs about half as much as the mercuric oxide composition. In some cases, particularly where cupric oxide is used, contact with the steel may be improved by first painting or spraying the inside of the recess in the steel plate on the bottom with a graphite paint formed for example, of 10% by weight of graphite in a 2% ethyl cellulose in xylol solution. The depolarizer is pressed into the bottom of the recess after the graphite paint has dried.

The electrolyte preferably consists of a solution of KOH which has been boiled with zinc oxide. For example, 75 grams of KOH may be added to 100 ml. of water and boiled with an excess of zinc oxide until saturated, then allowed to settle and vacuum filtered to produce a clear solution. Paper discs preferably formed of alkali treated paper are impregnated with this electrolyte. One paper which has been found to be suitable is Dexter paper produced from mixed hemp and wood fibres which are treated with a solution of sodium hydroxide in the pulp stage to produce a reaction of the alkali with part of the paper constituents and produce an alkali resistant paper.

The paper discs are immersed in the electrolyte during which time they swell in thickness and shrink in diameter slightly. They are then removed from the solution and the excess electrolyte is pressed out, for example by running the dics through a pair of rubber rollers to remove all free-flowing liquid. If the impregnated paper discs are 6 mils thick, five of them may be used to form a paper layer 32 about 30 mils thick which is laid on top of depolarizer layer 31. There is some tendency for the mercury or copper compounds to react with the paper fibres resulting in a reaction product evidenced by a darkening of the paper. If this product makes contact with the amalgamated zinc anode, a certain amount of local action appears to take place. I have found, however, that if the impregnated paper spacer is at least 20 mils thick these compounds will not ordinarily reach the zinc. In some cases it may be desirable to use a disc of Cellophane or dialyzing paper which has been impregnated with electrolyte in place of one of the paper layers. If used, this special layer is preferably placed in contact with the depolarizer.

The porous anode member 33 is also impregnated with electrolyte. This is preferably accomplished by placing the pressed amalgam powder disc in the electrolyte solution in a closed chamber and applying vacuum and pressure alternately to remove all gas from the pores of the pellet. The pellet is then taken from the bath and all free-flowing liquid is removed from it.

While for most purposes a paper spacer can be used it is also contemplated that the spacer 32 can be formed of other porous or absorbent materials which do not deleteriously react with the cell components. For example, a spacer can be made by grinding acid and alkali treated pure asbestos fibre and molding and pressing it into a disc about 30 mils thick. For a spacer 1.05 inches in diameter 300 milligrams of asbestos can be used and this will retain 500 milligrams of electrolyte. Such a spacer is entirely inert to mercuric oxide, cupric oxide and the other cell components. Instead of asbestos, a pressed talc disc may be used.

It may sometimes be desirable to increase the porosity of the compressed zinc amalgam powder pellet or disc. One means for increasing the porosity comprises adding 2 to 5% of suitable inert materials to the powder.

Sealing is effected and electrolyte creepage along the zinc surface prevented by the use of a pair of Neoprene rings 35 and 36. Ring 35 is of smaller diameter than zinc disc 34. Prior to assembly of the cell ring 35 is placed against the zinc disc and the edge of the zinc disc is spun over ring 35 and against it to cause compression and thereby effecting tight pressure sealing between the Neoprene ring and the zinc surface surrounding the central area which is to engage the anode 33. The second Neoprene ring 36 is of the same outer diameter as steel plate 30 and is laid on the plate surrounding the central depression in which the depolarizing layer has been pressed. The impregnated paper layers are laid on the oxide layer within the central opening of ring 36 and the zinc disc carrying sealing ring 35 and the impregnated zinc amalgam pellet 33 is placed against the bottom assembly to complete the cell unit. This cell unit is held under compression by any suitable means to assure sealing of the interior of the cell by pressure contact of the corresponding surfaces of members 34 and 35 with the upper surface of member 36. A number of these cell units are stacked under compression to produce a battery of any desired voltage.

Figure 2 shows a battery formed by lining a steel can 40 with a Pliofilm tube 41 and then stacking the cell assemblies in the cam with the steel plate 30 of the bottom assembly against the bottom wall of the can. A sealing ring 42 of Neoprene or other sealing material is placed over the top of the stack and the edge of the can is spun over this ring to apply compression to the stack and also to seal the entire battery.

By removing all free-flowing electrolyte from the impregnated spacers and amalgam pellets before assembly I have found that there is no tendency for the electrolyte to leak out except where it can creep along a zinc surface. By using the creepage blocking seals described herein creepage along the zinc is also effectively prevented.

While specific embodiments of the invention have been described, it is intended to cover the invention broadly within the spirit and scope of the appended claims.

What is claimed is:

1. A primary battery comprising a stack of flat primary cells, and a container enclosing said stack including means applying compression to said stack, each of the cells of said stack comprising an alkali-inert metal dish, a layer of depolarizer therein, a zinc disc, a porous zinc amalgam anode layer thereon, said anode and depolarizer being spaced in face-to-face relation, a porous sheet spacer interposed therebetween, an alkaline electrolyte impregnating said spacer and anode, and an insulating sealing wall surrounding said anode and spacer and compressed between said alkali-inert metal dish and said zinc disc by said battery container.

2. A dry battery comprising a stack of dry cells, and a container enclosing said stack including a portion under tension alongside said stack and portions connected thereto bearing against the ends of said stack to apply compression to said stack, each of the cells of said stack comprising a first metal plate, a layer of depolarizer thereon of smaller extent than said plate, a margin of said plate being provided surrounding said layer, a first ring of compliant material on said margin, an electrolyte-spacer layer within said ring and against the face of said depolarizer and comprising an electrolyte and an immobilizer for said electrolyte, an anode metal layer overlying said electrolyte-spacer layer, a second metal plate overlying said anode metal layer and of greater area than said layer to provide a margin surrounding said layer, and a second ring of compliant material on said second metal plate surrounding said anode metal layer and having its circumferential portions clamped between bent over marginal portions of said second plate, the first one of said rings being in pressure contact with said second ring and with the bent over marginal portions of said second metal plate to effect a seal.

3. A dry battery comprising a stack of dry cells and a container enclosing said stack and applying compression thereto, each of said cells comprising a metal dish having a depression therein, a body of depolarizer in said depression, a sealing ring of compliant material on said dish surrounding said depression, an electrolyte-spacer layer within said ring and overlying said depolarizer, said layer comprising a body of electrolyte and absorbent material, a layer of anode metal overlying said electrolyte-spacer layer, a metal plate overlying said anode metal layer and extending beyond the edges thereof, and a second sealing ring of compliant material surrounding said anode metal layer, the edge of said metal plate being turned over the edge of said second ring and clamping said edge under compression, said two sealing rings being in contact.

4. A dry cell adapted to be clamped in an assembly during use, said cell comprising a first metal plate, a layer of depolarizer thereon of smaller extent than said plate, a margin of said plate being provided surrounding said layer, a first ring of compliant material on said margin, an electrolyte-spacer layer within said ring and against the face of said depolarizer and comprising an electrolyte and an immobilizer for said electrolyte, an anode metal layer overlying said electrolyte-spacer layer, a second metal plate overlying said anode metal layer and of greater area than said layer to provide a margin surrounding said layer, and a second ring of compliant material on said second metal plate surrounding said anode metal layer and having its circumferential portions clamped between bent over marginal portions of said second plate, the first one of said rings being in pressure contact with said second ring and with the bent over marginal portions of said second metal plate to effect a seal.

5. A dry cell adapted for use in a clamped assembly, said cell comprising a metal dish having a depression therein, a body of depolarizer in said depression, a sealing ring of complaint material on said dish surrounding said depression, an electrolyte-spacer layer within said ring and overlying said depolarizer, said layer comprising a body of electrolyte and absorbent material, a layer of anode metal overlying said electrolyte-spacer layer, a metal plate overlying said anode metal layer and extending beyond the edges thereof, and a second sealing ring of compliant material surrounding said anode metal layer, the edge of said metal plate being turned over the edge of said second ring and clamping said edge under compression, said two sealing rings being in contact.

6. A primary battery comprising a stack of flat primary cells, and a container enclosing said stack including means applying compression to said stack, each of the cells of said stack comprising an alkali-inert metal dish, a layer of depolarizer therein, an anode terminal disc, a porous zinc amalgam anode layer thereon, said anode and depolarizer being spaced in face-to-face relation, a porous sheet spacer interposed therebetween, an alkaline electrolyte impregnating said spacer and anode, and an insulating sealing wall surrounding said anode and spacer and compressed between said alkali-inert metal dish and said anode terminal disc by said battery container.

SAMUEL RUBEN.

REFERENCES CITED

The following references are of record in the file of this patent:

UNITED STATES PATENTS

| Number | Name | Date |
| --- | --- | --- |
| 347,754 | Woodward | Aug. 17, 1886 |
| 413,438 | Eggers | Oct. 22, 1889 |
| 680,848 | Erny | Aug. 20, 1901 |
| 1,219,074 | Bronsted | Mar. 13, 1917 |
| 1,285,660 | Ford | Nov. 26, 1918 |
| 1,291,253 | Thatcher | Jan. 14, 1919 |
| 1,458,307 | Levaillant | June 12, 1923 |
| 1,611,153 | Benner et al. | Dec. 21, 1926 |
| 1,644,344 | Martus et al. | Oct. 4, 1927 |
| 1,997,367 | Killian | April 9, 1935 |
| 2,116,091 | Williams | May 3, 1938 |
| 2,282,344 | Ruben | May 12, 1942 |
| 2,422,045 | Ruben | June 10, 1947 |

FOREIGN PATENTS

| Number | Country | Date |
| --- | --- | --- |
| 392,208 | Great Britain | May 15, 1933 |